United States Patent
Jang et al.

(10) Patent No.: US 7,852,878 B2
(45) Date of Patent: Dec. 14, 2010

(54) APPARATUS AND METHOD FOR SUPPORTING ESTABLISHMENT OF NETWORK ADDRESS OF COMMUNICATION APPARATUS

(75) Inventors: Hee-Jin Jang, Yongin-si (KR); Jin-Hyeock Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 11/806,910

(22) Filed: Jun. 5, 2007

(65) Prior Publication Data

US 2008/0031278 A1 Feb. 7, 2008

Related U.S. Application Data

(60) Provisional application No. 60/834,484, filed on Aug. 1, 2006.

(30) Foreign Application Priority Data

Nov. 17, 2006 (KR) ................. 10-2006-0113591

(51) Int. Cl.
H04J 3/24 (2006.01)
(52) U.S. Cl. ..................... 370/475
(58) Field of Classification Search ........... 370/338, 370/389, 328, 252
See application file for complete search history.

(56) References Cited

U.S. PATENT DOCUMENTS

| | | | |
|---|---|---|---|
| 2001/0017856 A1* | 8/2001 | Asokan et al. | 370/389 |
| 2001/0046223 A1* | 11/2001 | Malki et al. | 370/338 |
| 2003/0012205 A1 | 1/2003 | Foti et al. | |
| 2003/0026230 A1* | 2/2003 | Ibanez et al. | 370/338 |
| 2005/0111377 A1* | 5/2005 | Lioy et al. | 370/252 |
| 2006/0029014 A1* | 2/2006 | Maturi | 370/328 |
| 2006/0176847 A1* | 8/2006 | Chen et al. | 370/328 |

FOREIGN PATENT DOCUMENTS

| | | |
|---|---|---|
| JP | 2003-018184 A | 1/2003 |
| JP | 2005-006147 A | 1/2005 |
| KR | 10-2005-012187 A | 1/2005 |
| KR | 10-2005-092405 A | 9/2005 |
| KR | 10-2006-037151 A | 5/2006 |
| KR | 2006-0039582 A | 5/2006 |
| KR | 10-2006-066580 A | 6/2006 |
| KR | 10-2006-0832039 A | 7/2006 |

OTHER PUBLICATIONS

RFC 2461: Neighbor Discovery for IP Version 6 (IPv6) by T. Narten et al., Network Working Group, Dec. 1998. www.ietf.org/rfc/rfc2461.txt.*

* cited by examiner

*Primary Examiner*—Albert T Chou
(74) *Attorney, Agent, or Firm*—NSIP Law

(57) ABSTRACT

An apparatus and method of setting an address of a communication apparatus is provided where when an access router transmits a Router Advertisement (RA) message to the communication apparatus, the communication apparatus sets an address establishment scheme of the communication apparatus according to a first field of the RA message. The RA message includes information about the address establishment scheme, which the communication apparatus is able to use, in the first field.

19 Claims, 9 Drawing Sheets

APPARATUS AND METHOD FOR SUPPORTING ESTABLISHMENT OF NETWORK ADDRESS OF COMMUNICATION APPARATUS

CROSS-REFERENCE TO RELATED APPLICATIONS

This application claims the benefit under 35 U.S.C. §119 (e) of a U.S. Provisional Application No. 60/834,484, filed on Aug. 1, 2006, in the U.S. Patent and Trademark Office, and under 35 U.S.C. §119(a) of a Korean Patent Application No. 10-2006-0113591, filed on Nov. 17, 2006, in the Korean Intellectual Property Office, the entire disclosure of both of which are hereby incorporated by reference.

BACKGROUND OF THE INVENTION

1. Field of the Invention

The present invention relates to an apparatus and method of setting an address of a communication apparatus. More particularly, the present invention relates to a communication apparatus and method of supporting various types of address establishment schemes.

2. Description of Related Art

In an Internet Protocol version 6 (IPv6) environment, a communication apparatus includes a 128-bit address. Also, the IPv6 environment generally includes two schemes to set an address of the communication apparatus.

A first scheme is suggested by Request for Comments (RFC) 2463 in which a communication apparatus generates a network address of the communication apparatus. The communication apparatus receives a Router Advertisement (RA) message from an access router. The RA message includes a 64-bit prefix which is utilized to generate the address of the communication apparatus. The communication apparatus generates the address to use by concatenating the 64-bit prefix with 64 bits, which are generated by the communication apparatus. Also, the communication apparatus performs a duplicate address detection (DAD) with respect to the generated address of the communication apparatus. When a uniqueness of the address is verified, the communication apparatus sets an address of the communication apparatus to the generated address.

A second scheme is suggested by RFC 3315 in which a communication apparatus receives an address, which the communication apparatus shall use, from a Dynamic Host Configuration Protocol version 6 (DHCPv6) server. The communication apparatus performs a DAD with respect to the received address, and sets an address of the communication apparatus to the received address when a uniqueness of the address is verified.

To perform communications using a communication apparatus, an address of the communication apparatus should be set. Both the first scheme and the second scheme should perform a DAD at all times. How to perform the DAD is disclosed in RFC 2461. However, since it takes a comparatively long time to perform the DAD, a great amount of initialization time may be required to utilize the communication apparatus.

In a substantial communication environment, a DAD may not be required to be performed, however, in a related art, the DAD should be performed at all times.

Also, in the related art, since an address establishment scheme that a communication shall use is fixed, a method capable of dynamically changing the address establishment scheme according to a communication environment of the communication apparatus is not provided.

Accordingly, there is a need for an improved apparatus and method for setting an address of a communication apparatus for supporting various types of address establishment schemes.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to set an address of a communication apparatus without performing a duplicate address detection (DAD) in a communication environment where the DAD is not required, and thereby reduce an initialization time of the communication apparatus.

An aspect of exemplary embodiments of the present invention is to enable an address establishment scheme to be dynamically changed according to a communication environment of a communication apparatus, so that an optimized address establishment scheme may be utilized according to the communication environment.

An aspect of exemplary embodiments of the present invention is to realize various types of address establishment schemes with respect to a communication apparatus in an Internet Protocol version 6 (IPv6) environment.

According to an aspect of exemplary embodiments of the present invention, there is provided an access router which transmits a Router Advertisement (RA) message to a communication apparatus, the RA message comprising information about an address establishment scheme, which the communication apparatus is able to use for an address establishment of the communication apparatus, in a first field of the RA message. In an exemplary implementation, the communication apparatus supports a plurality of address establishment schemes, and information about the address establishment scheme corresponds to information about the address establishment scheme, among the plurality of address establishment schemes that the communication apparatus is able to use for the address establishment of the communication apparatus.

According to another aspect of exemplary embodiments of the present invention, there is provided a communication apparatus which supports a plurality of address establishment schemes, receives a RA message from an access router, reads a first field of the received RA message, and determines an address establishment scheme of the communication apparatus according to the first field.

According to another aspect of exemplary embodiments of the present invention, there is provided an access router, wherein the access router transmits a RA message to a communication apparatus, the RA message comprising information about an address establishment scheme for the communication apparatus.

According to another aspect of exemplary embodiments of the present invention, there is provided an access router comprising a transmitter for transmitting messages, and a controller for controlling the transmitter to transmit a Router Advertisement (RA) message to a communication apparatus, the RA message comprising information about an address establishment scheme for the communication apparatus.

According to another aspect of exemplary embodiments of the present invention, there is provided a receiver for receiving messages, and a controller for controlling the receiver to receive a RA message, reading the received RA message, and determining an address establishment scheme of the communication apparatus.

In an exemplary implementation, when the first field comprises a first value, the communication apparatus sets an address of the communication apparatus to a network address acquired by the communication apparatus. More specifically, the communication apparatus automatically sets DupAddrDetectTransmits, corresponding to a node variable of an interface which receives the RA message, to 0, so that the DAD is not performed.

In an exemplary implementation, when the first field comprises a second value, the RA message comprises the network address that the communication apparatus is able to acquire, and the communication apparatus sets the network address as an address of the communication apparatus without performing a DAD. Also, the network address that the communication apparatus shall use is comprised in a prefix information option field of the RA message.

In an exemplary implementation, when the first field comprises a third value, the communication apparatus generates an auto-configured network address by using an EUI64 interface identifier, and sets the auto-configured network address to an address of the communication apparatus without performing a DAD.

In an exemplary implementation, when the first field comprises a fourth value, the communication apparatus 1) transmits a Neighbor Solicitation (NS) message comprising a network address, 2) receives a Neighbor Advertisement (NA) message responding to the NS message, and 3) sets the network address as an address of the communication apparatus when information indicating a uniqueness of the network address is comprised in the NA message.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
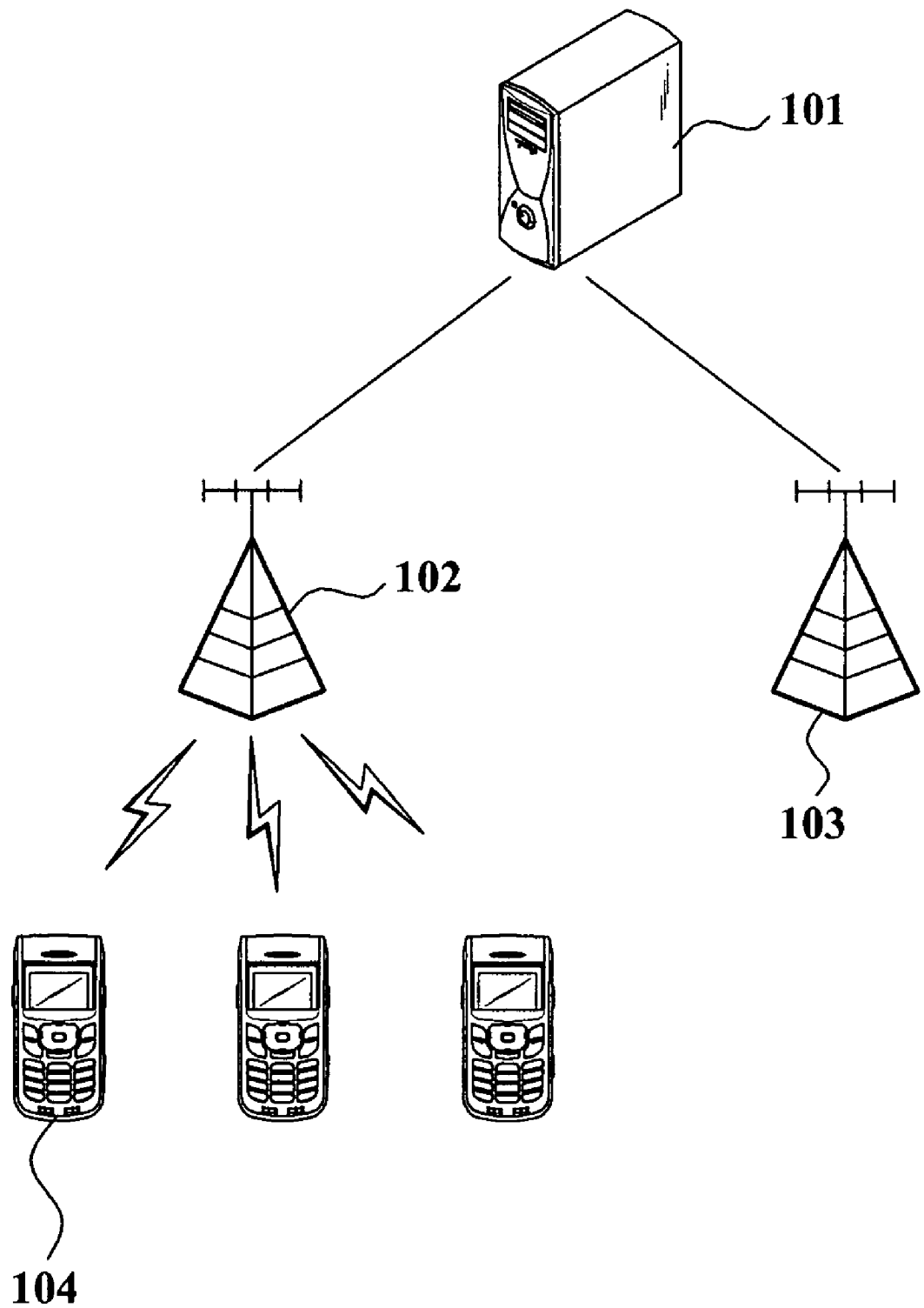
FIG. 1 is a diagram illustrating a communication connection between an access router and a communication apparatus according to an exemplary embodiment of the present invention.

FIG. 1 is a diagram illustrating a communication connection between an access router 101 and a communication apparatus 104 according to an exemplary embodiment of the present invention.

As shown in FIG. 1, the communication apparatus 104 connects with the access router 101 via base stations 102 and 103.

In an exemplary implementation, the access router 101, irrespective of the term "access router," indicates a device which manages an address establishment scheme of the communication apparatus 104. The access router 101 may perform various types of functions in addition to managing of the address establishment scheme. For example, the access router 101 may route data which is transmitted from/to a communication terminal or the communication device 104.

The access router 101 periodically broadcasts a Router Advertisement (RA) message to the communication apparatuses 104 which belong to a network managed by the access router 101. The access router 101 includes information about an address establishment scheme, which each of the communication apparatuses 104 shall use, in a first field of the RA message, and transmits the RA message to each of the communication apparatuses 104. Information about the address establishment scheme includes any one of a plurality of address establishment schemes supported by the communication apparatus 104.

When the communication apparatus 104 goes into a network area which is managed by the access router 101, the communication apparatus 104 is required to set an address of the communication apparatus 104 to perform communications. In an exemplary implementation, the communication apparatus 104 receives the RA message from the access router 101, reads a first field of the received RA message, and determines an address establishment scheme of the communication apparatus 104 according to the first field. The communication apparatus 104 supports the plurality of address establishment schemes. In an exemplary implementation, four address establishment schemes are suggested, however, the present invention is not limited thereto, and thus other address establishment schemes may be utilized without departing from the scope of the present invention.

The communication apparatus 104 sets its own address according to the determined address establishment scheme. When the address establishment is completed, the communication apparatus 104 starts communications.

Therefore, when the communication apparatus 104 moves to another network, and the other network utilizes another address establishment scheme, the communication apparatus 104 sets its own address by using the other address establishment scheme. Specifically, the address establishment scheme of the communication apparatus 104 is dynamically changed. According to an exemplary implementation, even when the network of the communication apparatus 104 is not changed, the access router 101 may enable the communication apparatus 104, which belongs to the network of the access router 101, to set a new address according to a new address establishment scheme due to a particular reason.

Figure 2:
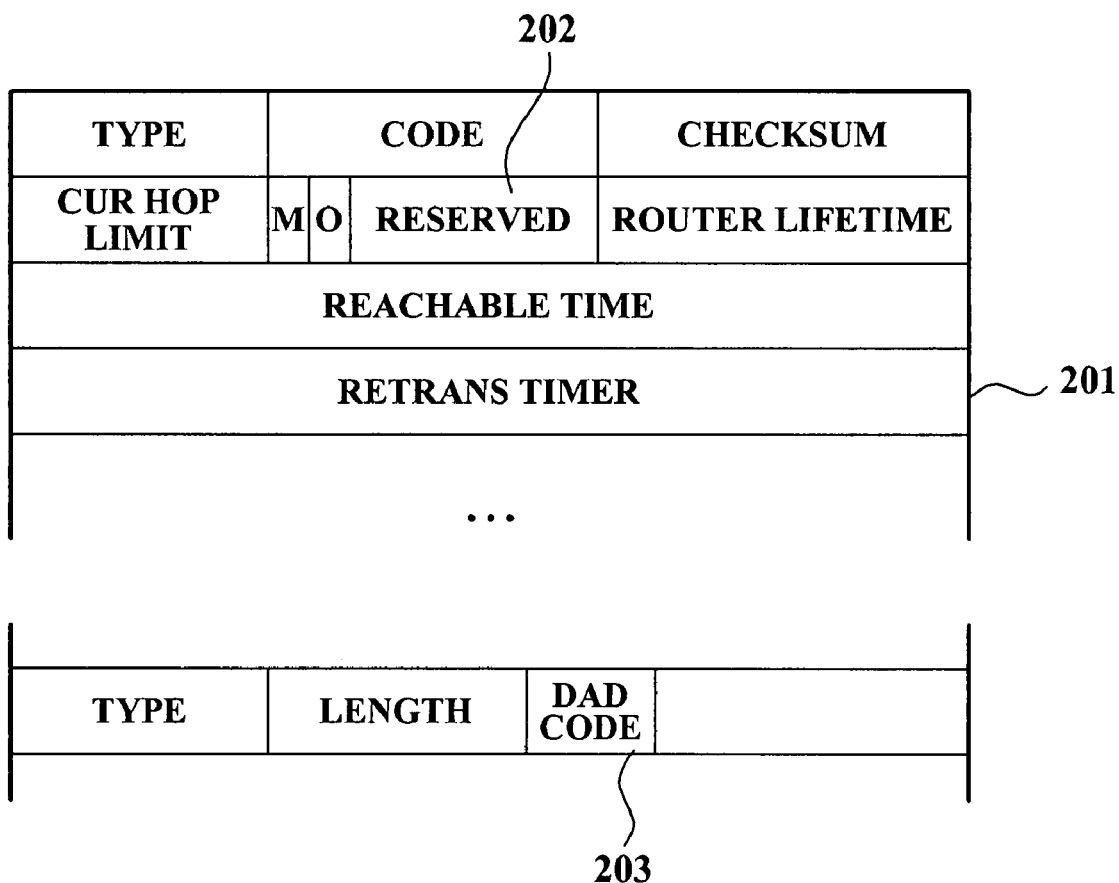
FIG. 2 illustrates a RA message according to an exemplary embodiment of the present invention.

FIG. 2 illustrates a RA message 201 transmitted from the access router 101 according to an exemplary embodiment of the present invention.

A reserved field 202 of the RA message 201 of Internet Protocol version 6 (IPv6) and a portion of option fields of the RA message 201 may be utilized for a first field. The first field stores information about an address establishment scheme that a communication apparatus according to an exemplary implementation is able to use. The portion of the option fields of the RA message 201 is referred to as a DAD code field 203.

One bit is utilized in the reserved field 202 of the RA message 201 of IPv6. When a value of the one bit is "0," an RFC 2461 scheme utilizing a DAD according to a related art is utilized. Specifically, the communication apparatus 104 reads the value of the one bit from the reserved field 202 of the received RA message 201. When the value of the one bit is "0," the communication apparatus 104 acquires its own network address according to RFC 2463 or RFC 3315, and performs a DAD according to RFC 2461. Also, when the network address is not a duplicate of an address of another device in use, the communication apparatus 104 sets an address of the communication apparatus 104 to the acquired network address.

When the value of the one bit is "1", the communication apparatus 104 additionally reads the DAD code field 203. An n number of bits are allocated to the DAD code field 203 according to a number of supported address establishment schemes. For example, when four address establishment schemes are additionally supported, two bits are allocated to the DAD code field 203. The communication apparatus 104 determines an address establishment scheme, from among a plurality of address establishment schemes, to set an address of the communication apparatus 104 according to a value of the DAD code field 203. Specifically, the communication apparatus 104 sets the address of the communication apparatus 104 by using the determined address establishment scheme.

According to another exemplary implementation, other fields of the RA message 201 may be utilized for the first field which stores information about the address establishment scheme that the communication apparatus 104 is able to use. For example, in the above-described implementation, the reserved field 202 of the RA message 201 of IPv6 and the DAD code field 203 of the RA message 201 are utilized for the first field, however only the reserved field 202 may be utilized alone for the first field.

Hereinafter, four address establishment schemes according to the present invention will be described.

Figure 3:
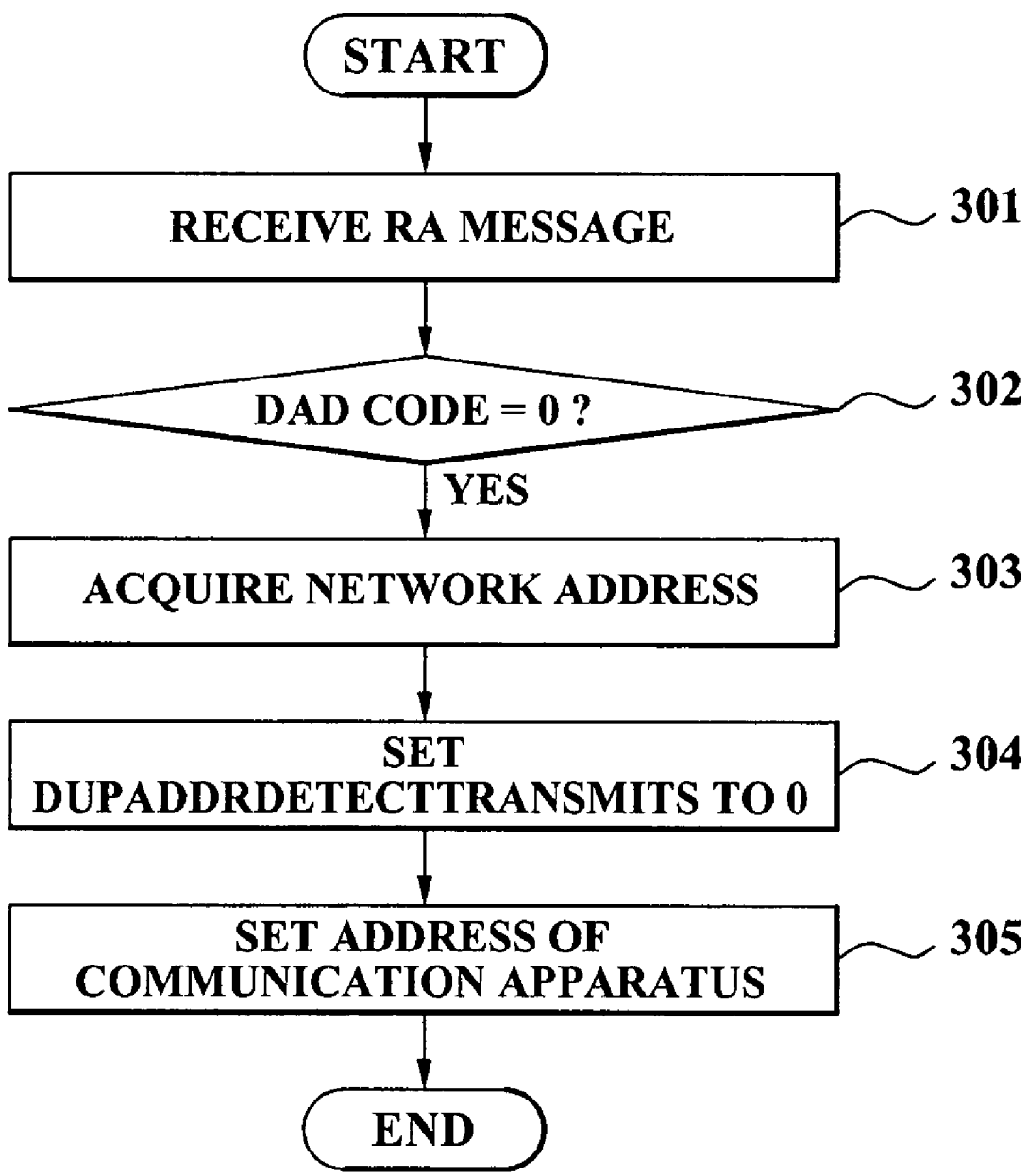
FIG. 3 is a flowchart illustrating a first address establishment scheme according to an exemplary embodiment of the present invention.

FIG. 3 is a flowchart illustrating a first address establishment scheme according to an exemplary embodiment of the present invention.

In the first address establishment scheme, the communication apparatus 104 sets an address of the communication apparatus 104 to a network address acquired by the communication apparatus 104, without performing a DAD. For example, when the DAD code field 203 of the RA message 201 received by the communication apparatus 104 includes a first value, for example, "0", the first value indicates that the communication apparatus 104 sets the address of the communication apparatus 104 according to the first address establishment scheme.

In step 301, the communication apparatus 104 receives the RA message 201 from the access router 101 via the base station 102. In step 302, the communication apparatus 104 reads the DAD code field 203 of the RA message 201. When the DAD code field 203 is determined to include the first value, for example, "0" in step 302, the communication apparatus 104 sets the address of the communication apparatus 104 according to the first address establishment scheme.

In step 303, the communication apparatus 104 acquires a network address that the communication apparatus 104 uses. The network address may include an IPv6 address. Also, the communication apparatus 104 may generate the network address that the communication 104 uses. For example, the communication apparatus 104 may generate the network address that the communication apparatus 104 uses according to an RFC 2463 scheme. The communication apparatus 104 receives the RA message 201 from the access router 101, and the RA message 201 includes a 64-bit prefix to utilize for generation of the network address. The communication apparatus 104 generates the network address that the communication apparatus 104 uses by concatenating the 64-bit prefix with 64 bits generated by the communication apparatus 104. Also, the communication apparatus 104 may acquire the network address, which the communication apparatus 104 uses, from another apparatus. For example, the communication apparatus 104 receives the network address, which the communication apparatus 104 uses, from a Dynamic Host Configuration Protocol version 6 (DHCPv6) server according to an RFC 3315 scheme.

The communication apparatus 104 sets the address of the communication apparatus 104 to the acquired network address, without performing a DAD. In step 304, the communication apparatus 104 automatically sets DupAddrDetectTransmits, corresponding to a node variable of an interface which receives the RA message 201, to 0. Specifically, when the DAD code field 203 of the RA message 201 received by the communication apparatus 104 includes a first value, for example, "0", the communication apparatus 104 automatically sets DuPAddrDetectTransmits, corresponding to the node variable, to "0" without an explicit command from a user. Thus, the communication apparatus 104 does not perform the DAD. In step 305, the communication apparatus 104 sets the address of the communication apparatus to the acquired network address.

The first address establishment scheme may be applied when a unique prefix is assigned to the communication apparatus 104, such as a 3rd Generation Partnership Project2 (3GPP2) model.

Figure 4:
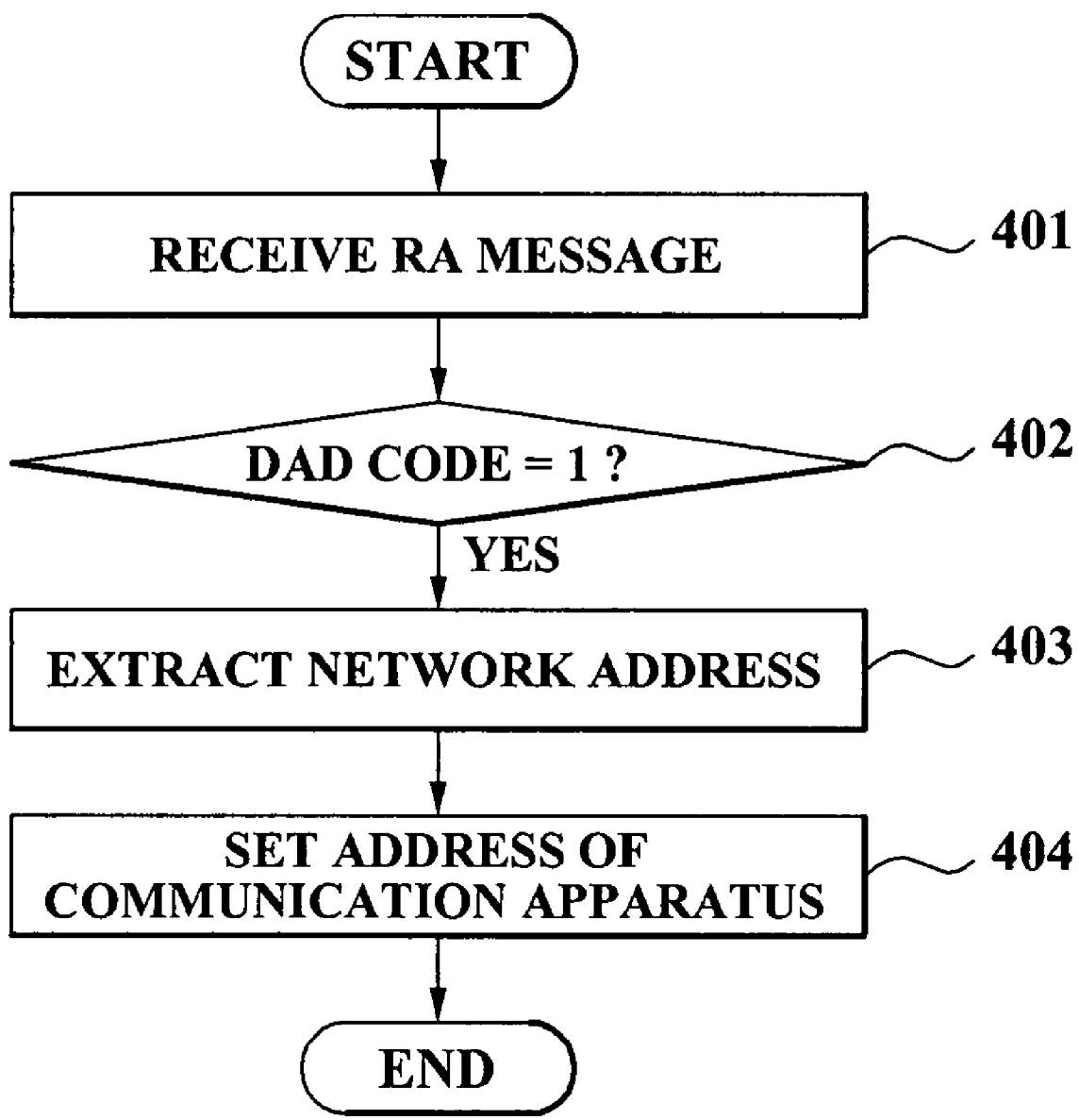
FIG. 4 is a flowchart illustrating a second address establishment scheme according to an exemplary embodiment of the present invention.

FIG. 4 is a flowchart illustrating a second address establishment scheme according to an exemplary embodiment of the present invention.

In the second address establishment scheme, the RA message 201 transmitted from the access router 101 includes a network address that the communication apparatus 104 uses), and the communication apparatus 104 sets an address of the communication apparatus 104 to the network address, without performing a DAD. For example, when the DAD code field 203 of the RA message 201 received by the communication apparatus 104 includes a second value, for example, "1", the second value indicates that the communication apparatus 104 sets the address of the communication apparatus 104 according to the second address establishment scheme.

In step 401, the communication apparatus 104 receives the RA message 201 from the access router 101 via the base station 102. In step 402, the communication apparatus 104 reads the DAD code field 203 of the RA message 201. When the DAD code field 203 is determined to include the second value, for example, "1" in step 402, the communication apparatus 104 sets the address of the communication apparatus 104 according to the second address establishment scheme.

Figure 5:
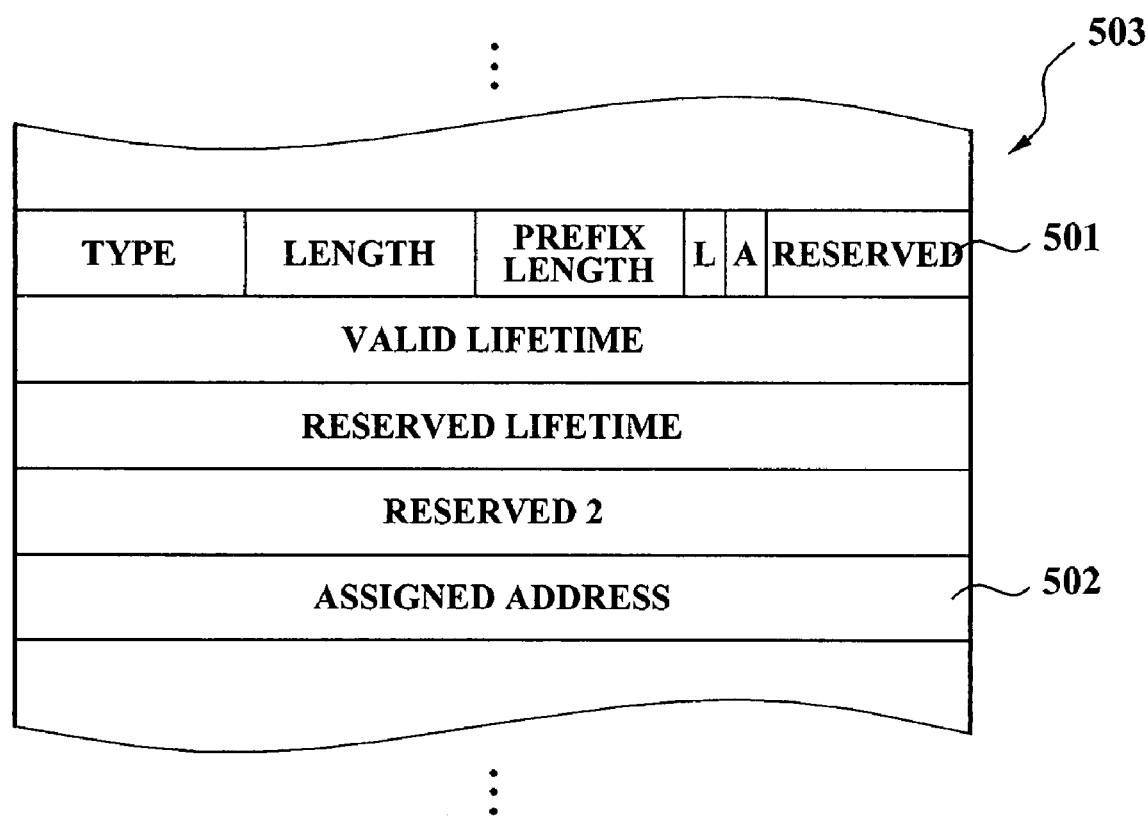
FIG. 5 illustrates a RA message according to a second address establishment scheme according to an exemplary embodiment of the present invention.

In the second address establishment scheme, a RA message received by the communication apparatus 104 includes a network address that the communication apparatus 104 uses. FIG. 5 illustrates an example of a RA message 503 according to the second address establishment scheme. Option fields of the RA message 503 corresponding to a portion of the RA message 503 are shown in FIG. 5. According to an exemplary implementation, the network address that the communication apparatus 104 shall use is included in a prefix information option (PIO) field among the option fields of the RA message 503. Also, a flag of a reserved field 501 is defined from the PIO fields. When the flag includes a predetermined value, a data field 502 of the PIO field includes the network address that the communication apparatus 104 uses.

In step 403, when the DAD code field 203 is determined to include the second value, for example, "1", in step 402, the communication apparatus 104 extracts the network address from the RA message 201. When the network address that the communication apparatus 104 uses is stored in the RA message 503 as shown in FIG. 5, the communication apparatus 104 identifies the predetermined flag in the reserved field 501 of the PIO fields. When the flag includes a particular value, the communication apparatus 104 extracts the network address which is included in the data field 502 of the PIO fields. The data field 502 includes the network address that the communication apparatus 104 uses. The network address may include an IPv6 address. In step 404, the communication apparatus 104 sets the network address, which is included in the RA message, as the address of the communication apparatus 104 without performing a DAD.

The second address establishment scheme may be useful in a network where address information of the communication apparatus 104 can be centrally managed, such as World Interoperability for Microwave Access (WiMAX), and wireless broadband Internet (WiBro).

Figure 6:
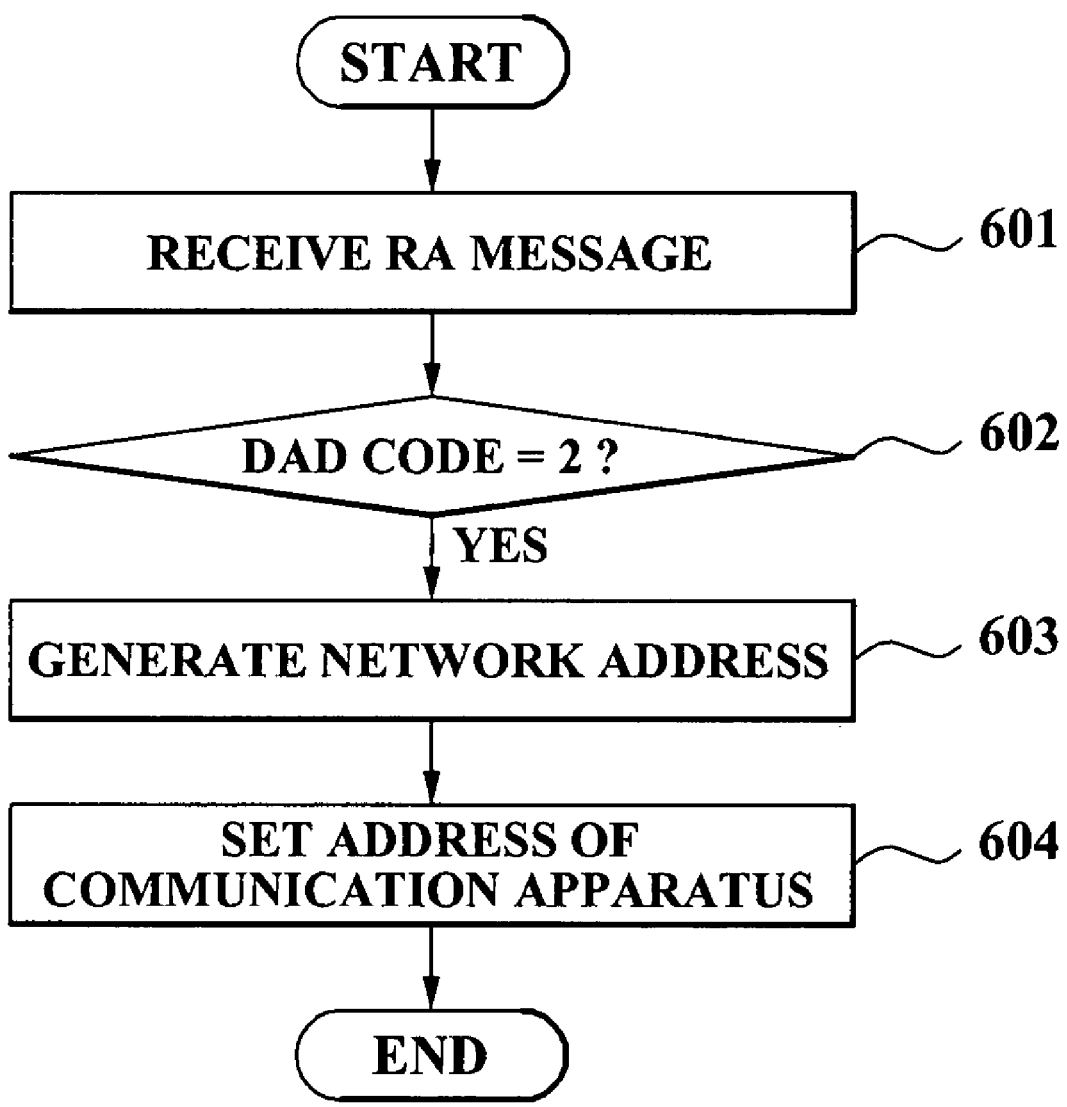
FIG. 6 is a flowchart illustrating a third address establishment scheme according to an exemplary embodiment of the present invention.

FIG. 6 is a flowchart illustrating a third address establishment scheme according to an exemplary embodiment of the present invention.

In the third address establishment scheme, the communication apparatus 104 generates an auto-configured network address by using an EUI64 interface identifier, and sets an address of the communication apparatus 104 to the auto-configured network address, without performing a DAD. For example, when the DAD code field 203 of the RA message 201 received by the communication apparatus 104 includes a third value, for example, "2", the third value indicates that the communication apparatus 104 sets the address of the communication apparatus 104 according to the third address establishment scheme.

In step 601, the communication apparatus 104 receives the RA message 201 from the access router 101 via the base station 102. In step 602, the communication apparatus 104 reads the DAD code field 203 of the RA message 201. When the DAD code field 203 is determined to include the third value, for example, "2" in step 602, the communication apparatus 104 sets the address of the communication apparatus 104 according to the third address establishment scheme.

According to the third address establishment scheme, in step 603, the communication apparatus 104 generates a network address that the communication apparatus 104 uses. According to an exemplary implementation, the communication apparatus 104 generates an auto-configured network address by using an EUI64 interface identifier. Hereinafter, when the network address corresponds to an IPv6 address will be described. The IPv6 address consists of 128 bits. The RA message 201 received by the communication apparatus 104 from the access router 101 includes a 64-bit prefix to utilize for generation of the network address. The communication apparatus 104 utilizes the 64-bit prefix for upper 64 bits of the network address. Also, the communication apparatus 104 generates a 64-bit EUI64 interface identifier from a 48-bit Media Access Control (MAC) address of the communication apparatus 104. The communication apparatus 104 utilizes the 64-bit EUI64 interface identifier for lower 64 bits of the network address. The 128-bit IPv6 address is generated by concatenating the 64-bit EUI64 interface identifier with the 64-bit prefix, included in the RA message 204. Also, the communication apparatus 104 may generate the network address according to other various types of schemes. In step 604, the communication apparatus 104 sets the generated network address as an address of the communication apparatus 104 without performing a DAD.

The third address establishment scheme may be applied when a unique prefix is assigned to the communication apparatus 104, such as a 3GPP2 model.

Figure 7:
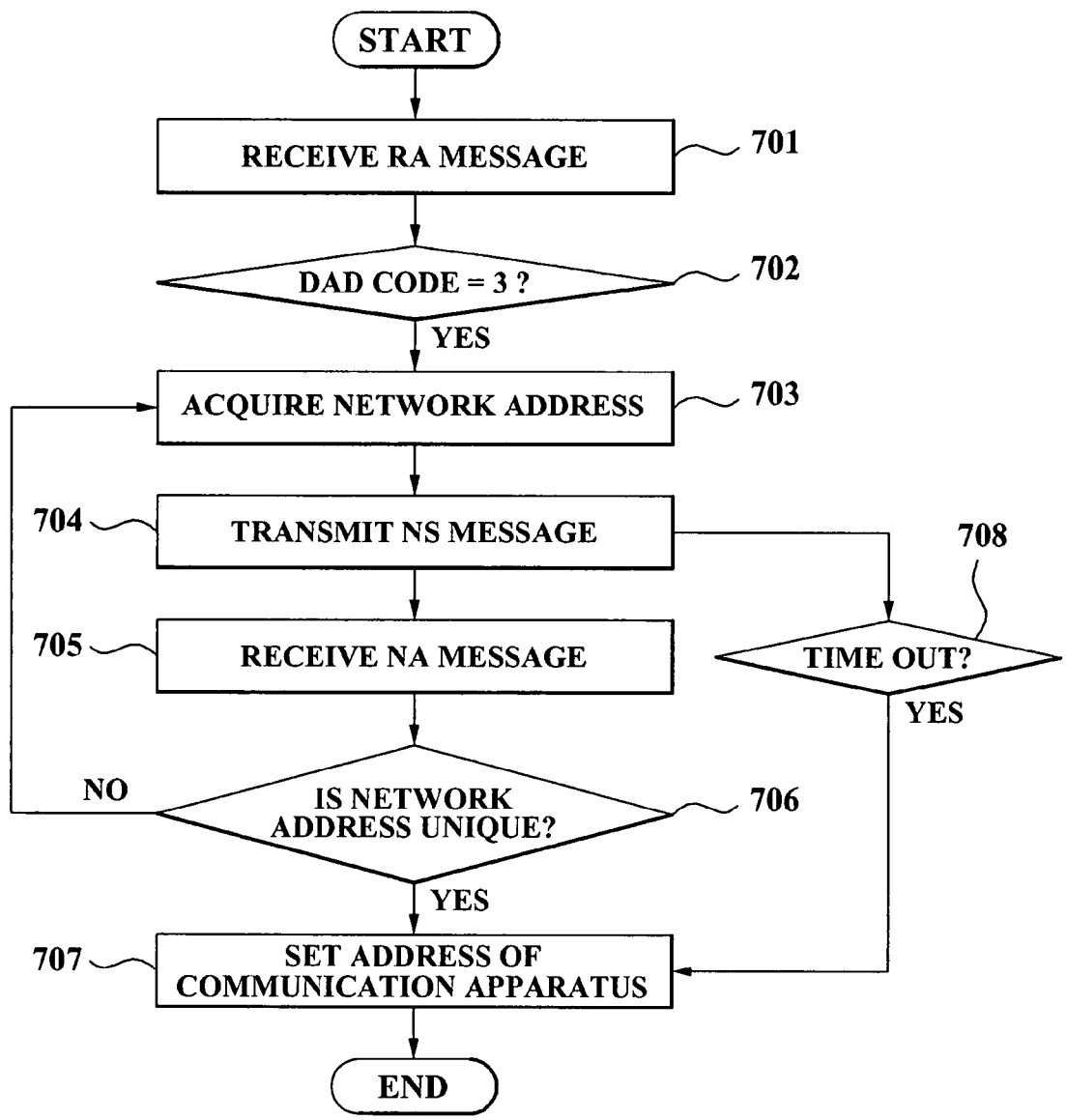
FIG. 7 is a flowchart illustrating a fourth address establishment scheme according to an exemplary embodiment of the present invention.

FIG. 7 is a flowchart illustrating a fourth address establishment scheme according to an exemplary embodiment of the present invention.

In the fourth address establishment scheme, when information indicating a uniqueness of a network address of the communication apparatus 104 is included in a Neighbor Advertisement (NA) message responding to a Neighbor Solicitation (NS) message including the network address of the communication apparatus 104, the communication apparatus 104 sets the network address as an address of the communication apparatus. For example, when the DAD code field 203 of the RA message 201 received by the communication apparatus 104 includes a fourth value, for example, "3", the fourth value indicates that the communication apparatus 104 sets the address of the communication apparatus 104 according to the four address establishment scheme.

In step 701, the communication apparatus 104 receives the RA message 201 from the access router 101 via the base station 102. In step 702, the communication apparatus 104 reads the DAD code field 203 of the RA message 201. When the DAD code field 203 is determined to include the fourth value, for example, "3" in step 702, the communication apparatus 104 sets the address of the communication apparatus 104 according to the fourth address establishment scheme.

In step 703, the communication apparatus 104 acquires a network address that the communication apparatus 104 uses. The network address may include an IPv6 address. Also, the communication apparatus 104 may generate the network address that the communication 104 uses. For example, the communication apparatus 104 may generate the network address that the communication apparatus 104 uses according to an RFC 2463 scheme. Also, the communication apparatus 104 may acquire the network address, which the communication apparatus 104 uses, from another apparatus. For example, the communication apparatus 104 receives the network address, which the communication apparatus 104 uses, from a DHCPv6 server according to an RFC 3315 scheme.

In step 704, the communication apparatus 104 transmits an NS message to verify a uniqueness of the network address.

The NS message includes the generated network address. Also, the NS message may be broadcasted.

In step 708, when no response is received within a predetermined time, for example, one second, the communication apparatus 104 determines the network address is unique. In step 707, the communication apparatus 104 sets the network address as the address of the communication apparatus 104.

In step 705, when an NA message is received within the predetermined time, for example, one second, the communication apparatus 104 reads the NA message. In step 706, the communication apparatus 104 determines whether the NA message includes information that the network address is being utilized. When the network address is being utilized, the network address is not unique and thus the communication apparatus 104 returns to step 703 and acquires the network address that the communication apparatus 104 uses.

In an exemplary implementation, when the network address is unique, the NA message includes information indicating the uniqueness of the network address. In the related art, when the network address is not unique, the NA message includes information indicating the non-uniqueness of the network address, however, when the network address is unique, the NA message excludes information indicating the uniqueness of the network address. Therefore, in the related art, when determining the network address is unique, the communication apparatus 104 is required to wait for a predetermined time. However, since a wait time is long, it prolongs an initialization time of the communication apparatus 104. In an exemplary implementation, when the network address is unique, the NA message includes information indicating the uniqueness of the network address. Therefore, the communication apparatus 104 may set the network address to an address of the communication apparatus 104 without waiting for the predetermined time.

In step 707, when the NA message is determined to include information indicating the uniqueness of the network address in step 706, the communication apparatus 104 sets the network address to the address of the communication apparatus 104 without waiting for the predetermined time.

In the fourth address establishment scheme, a portion, for example, an access router, of devices, which receive an NS message, is aware of information about addresses assigned to a network. Therefore, when the devices receive the NS message, the devices determine whether a network address included in the NS message is unique, and includes a corresponding result in an NA message, and transmits the NA message to the communication apparatus 104.

Figure 8:
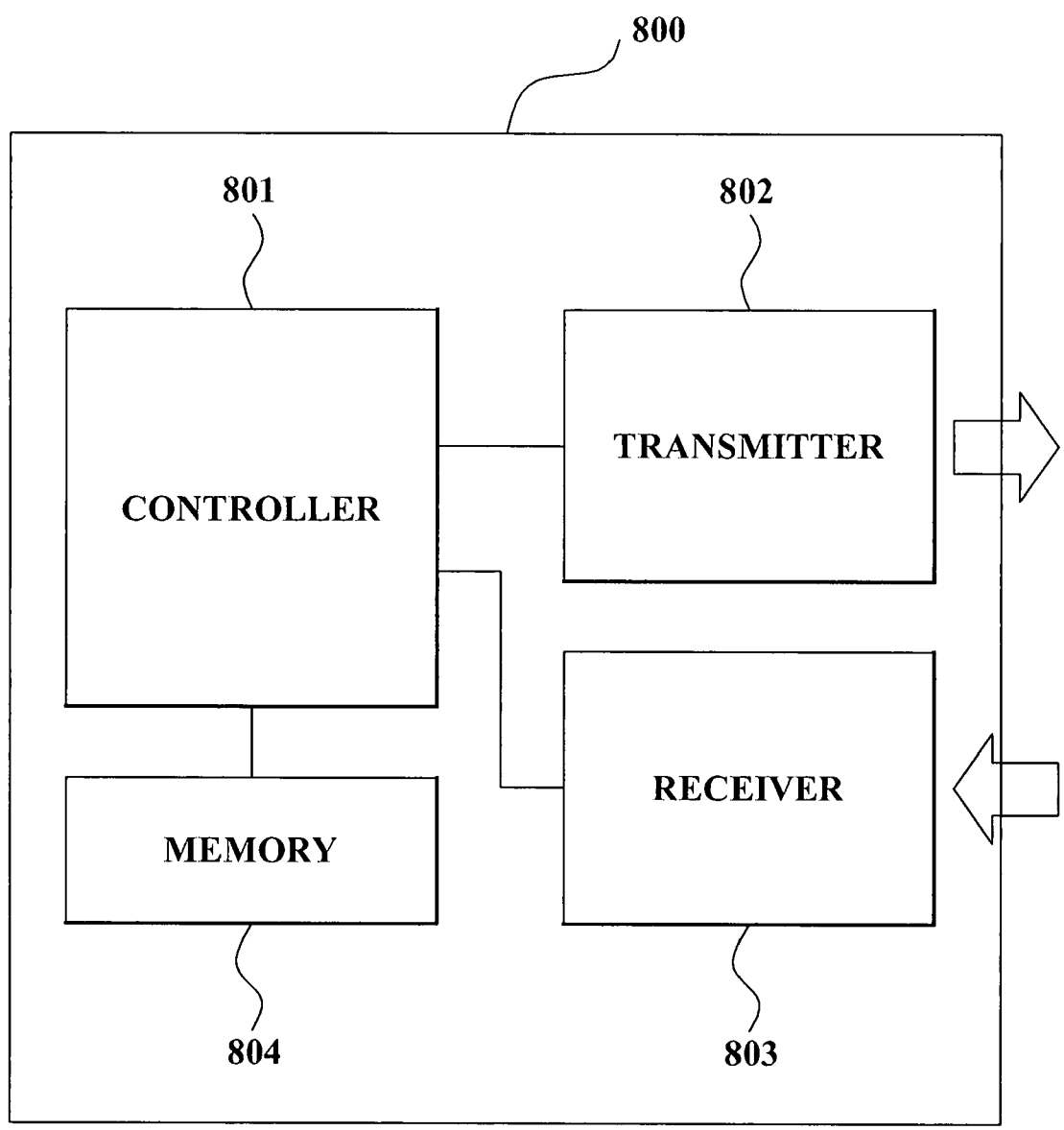
FIG. 8 is a block diagram illustrating an access router according to an exemplary embodiment of the present invention.

FIG. 8 is a block diagram illustrating an access router 800 according to an exemplary embodiment of the present invention.

The access router 800 comprises a controller 801, a transmitter 802, a receiver 803, and a memory 804. The transmitter 802 transmits messages. The receiver 803 receives messages. The memory 804 stores data. The controller 801 controls the transmitter 802 to transmit a Router Advertisement (RA) message to a communication apparatus. For example, the controller 801 controls the transmitter 802 to periodically broadcast a Router Advertisement (RA) message to communication apparatuses which belong to a network managed by the access router 800. The RA message comprises information about an address establishment scheme for the communication apparatus. Information about the address establishment scheme includes any one of a plurality of address establishment schemes supported by the communication apparatus.

Figure 9:
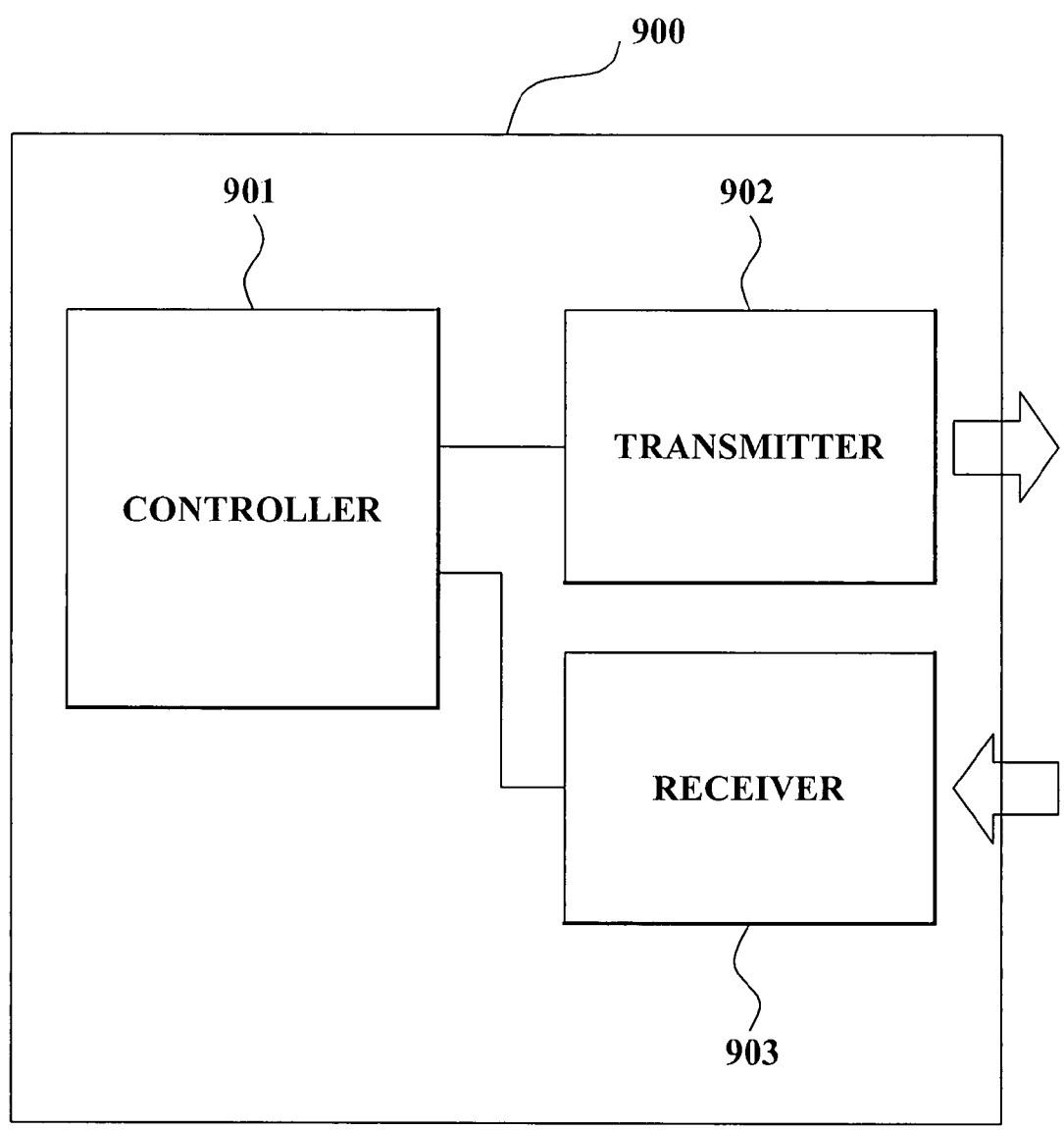
FIG. 9 is a block diagram illustrating a communication apparatus according to an exemplary embodiment of the present invention.

FIG. 9 is a block diagram illustrating a communication apparatus 900 according to an exemplary embodiment of the present invention.

The communication apparatus 900 comprises a controller 901, a transmitter 902, and a receiver 903. The transmitter 902 transmits messages. The receiver 903 receives messages. The controller 901 controls the receiver 903 to receive a router advertisement (RA) message from an access router and reads the received RA message. The controller 901 determines an address establishment scheme of the communication apparatus 900 according to the information in the RA message. The communication apparatus 900 supports the plurality of address establishment schemes. Four address establishment schemes are suggested in the above, however, the present invention is not limited thereto, and thus other address establishment schemes may be utilized without departing from the scope of the present invention.

According to the fourth address establishment scheme, a pair of messages enables both an address assignment and a reachability of an access router at the same time.

The address establishment method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to an exemplary embodiment of the present invention, it is possible to set an address of a communication apparatus without performing a DAD in a communication environment where the DAD is not required. Therefore, an initialization time of the communication apparatus may be reduced. Also, since a DAD transmission packet is not required, network loads may be reduced and broadcast messages may be less utilized.

Also, according to an exemplary embodiment of the present invention, it is possible to dynamically change an address establishment scheme that a communication apparatus uses according to a communication environment of the communication apparatus. Therefore, the communication apparatus may utilize an optimized address establishment scheme according to the communication apparatus. Also, an address establishment scheme of each of communication apparatuses may be dynamically changed in a network according to an address assignment policy of a network manager.

Also, according to an exemplary embodiment of the present invention, it is possible to realize various types of address establishment schemes with respect to a communication apparatus in an IPv6 environment.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for setting an address, the apparatus comprising:
an access router, wherein the access router transmits a Router Advertisement (RA) message to a communication apparatus, the RA message comprising information indicating which address establishment scheme the communication apparatus is to use for setting an address of the communication apparatus among a plurality of address establishment schemes that the communication apparatus supports,
wherein the information indicates whether the RA message comprises a full address usable by the communication apparatus, and whether the communication apparatus performs a duplicate address detection (DAD) with respect to the full address in order to set the address of the communication apparatus, and
wherein the address establishment scheme useable by the communication apparatus is dynamically changed.

2. The apparatus of claim 1, wherein the information about the address establishment scheme corresponds to information about the address establishment scheme among the plurality of address establishment schemes usable by the communication apparatus for the address establishment of the communication apparatus.

3. The apparatus of claim 1, wherein, when a first field of the RA message comprises a first value, the first value indicates that the communication apparatus is to use a full address acquired by the communication apparatus as an address of the communication apparatus without performing a duplicate address detection (DAD).

4. The apparatus of claim 1, wherein, when a first field of the RA message comprises a second value, the second value indicates that the RA message comprises a full address usable by the communication apparatus, and the communication apparatus uses the full address as an address of the communication apparatus without performing a duplicate address detection (DAD).

5. The apparatus of claim 4, wherein a prefix information option field of the RA message comprises the full address usable by the communication apparatus.

6. The apparatus of claim 1, wherein, when a first field of the RA message comprises a third value, the third value indicates that the communication apparatus generates an auto-configured full address by using an EUI64 interface identifier.

7. The apparatus of claim 6, wherein the communication apparatus uses the auto-configured network address as an address of the communication apparatus without performing a duplicate address detection (DAD).

8. The apparatus of claim 1, wherein, when a first field of the RA message comprises a fourth value, the fourth value indicates that the communication apparatus uses a full address as an address of the communication apparatus when a Neighbor Advertisement (NA) message responding to a Neighbor Solicitation (NS) message comprising the full address of the communication apparatus comprises information indicating a uniqueness of the full address.

9. The apparatus of claim 8, wherein the full address corresponds to an Internet Protocol version 6 (IPv6) address.

10. The apparatus of claim 1, wherein a first field of the RA message comprises the information about the address establishment scheme.

11. A communication apparatus, wherein the communication apparatus:
supports a plurality of address establishment schemes for setting an address of the communication apparatus;
receives a router advertisement (RA) message from an access router,
reads a first field of the received RA message, the first field indicating which address establishment scheme the communication apparatus is to use for setting an address of the communication apparatus; and
dynamically changes an address establishment scheme of the communication apparatus to the address establishment scheme indicated by the first field, among the plurality of address establishment schemes,
wherein the first field indicates whether the RA message comprises a full address usable by the communication apparatus, and whether the communication apparatus performs a duplication address detection (DAD) with respect to the full address in order to set the address of the communication apparatus.

12. The communication apparatus of claim 11, where the apparatus determines the address establishment scheme of the communication apparatus by using any one of the plurality of address establishment schemes according to the first field.

13. The communication apparatus of claim 11, wherein, when the first field comprises a first value, the communication apparatus sets a full address acquired by the communication apparatus to an address of the communication apparatus without performing a duplicate address detection (DAD).

14. The communication apparatus of claim 13, wherein the communication apparatus automatically sets DupAddrDetectTransmits, corresponding to a node variable of an interface which receives the RA message, to 0, so that the DAD is not performed.

15. The communication apparatus of claim 11, wherein, when the first field comprises a second value, the RA message comprises the full address usable by the communication apparatus, and the communication apparatus sets the full address as an address of the communication apparatus without performing a duplicate address detection (DAD).

16. The communication apparatus of claim 15, wherein a prefix information option field of the RA message comprises the full address usable by the communication apparatus.

17. The communication apparatus of claim 11, wherein, when the first field comprises a third value, the communication apparatus generates an auto-configured full address by using an EUI64 interface identifier, and the communication apparatus sets the auto-configured full address to an address of the communication apparatus without performing a DAD.

18. The communication apparatus of claim 11, wherein, when the first field comprises a fourth value, the communication apparatus transmits a Neighbor Solicitation (NS) message comprising a full address, receives a Neighbor Advertisement (NA) message responding to the NS message, and sets the full address as an address of the communication apparatus when the NA message comprises information indicating a uniqueness of the full address.

19. A method of setting an address of a communication apparatus, the method comprising:
receiving a router advertisement (RA) message from an access router, the RA message comprising information indicating which address establishment scheme the communication apparatus is to use for setting an address of the communication apparatus among a plurality of address establishment schemes that the communication apparatus supports;
reading the received RA message; and
dynamically changing an address establishment scheme of the communication apparatus to the address establishment scheme indicated by the information of the RA message, among the plurality of address establishment schemes,
wherein the information indicates whether the RA message comprises a full address usable by the communication apparatus, and whether the communication apparatus performs a duplicate address detection (DAD) with respect to the full address in order to set the address of the communication apparatus.

\* \* \* \* \*